United States Patent
Cariou et al.

(10) Patent No.: US 10,972,157 B2
(45) Date of Patent: Apr. 6, 2021

(54) MULTIUSER MULTIPLE-INPUT AND MULTIPLE-OUTPUT SETUP FRAME

(71) Applicant: INTEL IP CORPORATION, Santa Clara, CA (US)

(72) Inventors: Laurent Cariou, Portland, OR (US); Carlos Cordeiro, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 180 days.

(21) Appl. No.: 15/904,978

(22) Filed: Feb. 26, 2018

(65) Prior Publication Data

US 2018/0191409 A1 Jul. 5, 2018

Related U.S. Application Data

(63) Continuation of application No. 15/083,061, filed on Mar. 28, 2016, now abandoned.

(60) Provisional application No. 62/277,015, filed on Jan. 11, 2016.

(51) Int. Cl.
| | |
|---|---|
| *H04B 7/0452* | (2017.01) |
| *H04B 7/26* | (2006.01) |
| *H04L 5/00* | (2006.01) |
| *H04W 72/04* | (2009.01) |

(52) U.S. Cl.
CPC ......... *H04B 7/0452* (2013.01); *H04B 7/2656* (2013.01); *H04L 5/0053* (2013.01); *H04W 72/048* (2013.01); *H04W 72/0446* (2013.01)

(58) Field of Classification Search
CPC .................................................. H04B 7/0452
See application file for complete search history.

(56) References Cited

U.S. PATENT DOCUMENTS

| | | | |
|---|---|---|---|
| 8,971,303 B2 | 3/2015 | Lee et al. | |
| 9,967,061 B2* | 5/2018 | Ryu | ...................... H04L 1/1809 |
| 2005/0165950 A1* | 7/2005 | Takagi | .................. H04L 69/324 |
| | | | 709/236 |
| 2006/0050742 A1 | 3/2006 | Grandhi et al. | |
| 2006/0092871 A1 | 5/2006 | Nishibayashi et al. | |
| 2010/0309868 A1 | 12/2010 | Yang et al. | |
| 2011/0150004 A1 | 6/2011 | Denteneer et al. | |
| 2011/0255618 A1* | 10/2011 | Zhu | ...................... H04B 7/0413 |
| | | | 375/260 |
| 2011/0317630 A1 | 12/2011 | Zhu et al. | |
| 2012/0076073 A1* | 3/2012 | Merlin | .............. H04W 74/0816 |
| | | | 370/328 |

(Continued)

*Primary Examiner* — Edan Orgad
*Assistant Examiner* — Andrew C Lee
(74) *Attorney, Agent, or Firm* — Eversheds Sutherland (US) LLP

(57) ABSTRACT

This disclosure describes systems, methods, and devices related to a multiuser multiple-input and multiple-output (MU-MIMO) setup frame. A device may generate an MU-MIMO setup frame comprising a physical layer (PHY) header and a media access control (MAC) header, the PHY header comprising an indication of a control trailer after the MAC header, the MAC header comprising a first receive address (RA) field comprising one or more first device identifiers (IDs), and the control trailer comprising a second RA field comprising one or more second device IDs. The device may transmit the MU-MIMO setup frame over a directional multi-gigabit (DMG) channel.

15 Claims, 7 Drawing Sheets

(56) References Cited

U.S. PATENT DOCUMENTS

| | | | |
|---|---|---|---|
| 2012/0087316 A1* | 4/2012 | Merlin | H04W 28/26 370/329 |
| 2012/0327915 A1* | 12/2012 | Kang | H04L 5/0007 370/336 |
| 2013/0272272 A1 | 10/2013 | Sudak et al. | |
| 2013/0301569 A1* | 11/2013 | Wang | H04L 1/1854 370/329 |
| 2014/0010152 A1* | 1/2014 | Park | H04W 28/065 370/328 |
| 2014/0064255 A1 | 3/2014 | Trainin et al. | |
| 2014/0086200 A1 | 3/2014 | Seok | |
| 2014/0152501 A1 | 6/2014 | Greenberg et al. | |
| 2014/0189172 A1 | 7/2014 | Sadeghi et al. | |
| 2014/0254647 A1 | 9/2014 | Stott et al. | |
| 2015/0063190 A1* | 3/2015 | Merlin | H04L 1/1887 370/312 |
| 2015/0063330 A1 | 3/2015 | Frederiks et al. | |
| 2015/0071051 A1* | 3/2015 | Zhu | H04W 72/121 370/216 |
| 2015/0071204 A1* | 3/2015 | Seok | H04W 74/08 370/329 |
| 2015/0230244 A1* | 8/2015 | Choi | H04L 12/4641 370/329 |
| 2015/0244448 A1 | 8/2015 | Seok | |
| 2015/0282183 A1 | 10/2015 | Sverdlov et al. | |
| 2015/0349857 A1 | 12/2015 | Cordeiro et al. | |
| 2016/0044711 A1 | 2/2016 | Lou et al. | |
| 2016/0066198 A1 | 3/2016 | Wang et al. | |
| 2016/0088602 A1* | 3/2016 | Seok | H04L 5/0055 370/338 |
| 2016/0127233 A1 | 5/2016 | Wentink et al. | |
| 2016/0128024 A1 | 5/2016 | Frederiks et al. | |
| 2016/0134406 A1* | 5/2016 | Chu | H04L 5/0037 370/329 |
| 2016/0212703 A1* | 7/2016 | Seok | H04L 1/1628 |
| 2017/0026981 A1 | 1/2017 | Cariou et al. | |
| 2017/0048844 A1 | 2/2017 | Chen et al. | |
| 2017/0078008 A1 | 3/2017 | Kasher et al. | |
| 2017/0079031 A1 | 3/2017 | Maltsev et al. | |
| 2017/0104570 A1 | 4/2017 | Kim et al. | |
| 2017/0156104 A1 | 6/2017 | Grandhi et al. | |
| 2017/0170937 A1* | 6/2017 | Chun | H04B 7/0452 |
| 2019/0288763 A1* | 9/2019 | Oteri | H04B 7/0697 |
| 2020/0067577 A1* | 2/2020 | Lou | H04W 74/002 |

\* cited by examiner

MULTIUSER MULTIPLE-INPUT AND MULTIPLE-OUTPUT SETUP FRAME

CROSS-REFERENCE TO RELATED APPLICATIONS

This application is a continuation of U.S. application Ser. No. 15/083,061 filed Mar. 28, 2016, which claims the benefit of U.S. Provisional Application No. 62/277,015 filed Jan. 11, 2016, the disclosures of which are incorporated herein by reference as if set forth in full.

TECHNICAL FIELD

This disclosure generally relates to systems and methods for wireless communications and, more particularly, to a multiuser multiple-input and multiple-output setup frame.

BACKGROUND

Wireless devices are becoming widely prevalent and are increasingly requesting access to wireless channels. A wireless communication network in a millimeter-wave band may provide high-speed data access for users of wireless communication devices.

DETAILED DESCRIPTION

Figure 1:
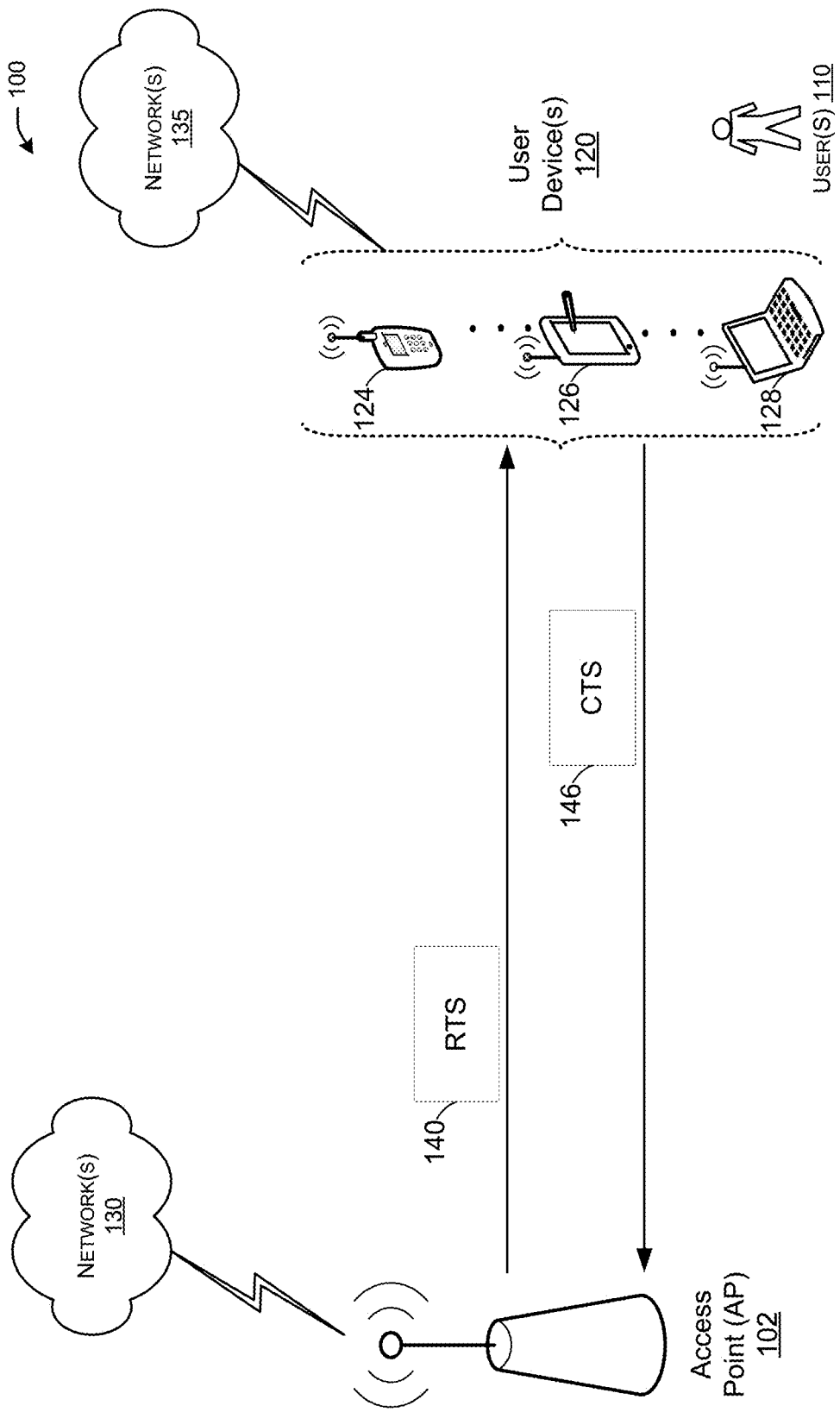
FIG. 1 depicts a network diagram illustrating an example network environment of an illustrative multiuser multiple-input and multiple-output (MU-MIMO) setup frame system, in accordance with some demonstrative embodiments.

Example embodiments described herein provide certain systems, methods, and devices for providing signaling information to Wi-Fi devices in various Wi-Fi networks, including, but not limited to, IEEE 802.11ax (referred to as HE or HEW).

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

During communication between two devices, one or more frames may be sent and received. These frames may include one or more fields (or symbols) that may be based on IEEE 802.11 specifications, including, but not limited to, an IEEE 802.11ad specification, or IEEE 802.11ay specification. Devices may operate in multiuser multiple-input and multiple-output (MU-MIMO) technology. It is understood that MIMO facilitates multiplying the capacity of a radio link using multiple transmit and receive antennas to exploit multipath propagation. MIMO provides a practical technique for sending and receiving more than one data signal on the same radio channel at the same time via multipath propagation. MU-MIMO provides a means for wireless devices to communicate with each other using multiple antennas such that the wireless devices may transmit at the same time and frequency and still be separated by their spatial signatures. For example, using MU-MIMO technology, an access point (AP) may be able to communicate with multiple devices using multiple antennas at the same time to send and receive data. An AP operating in MU-MIMO and in a 60 GHz frequency band may utilize an MU-MIMO frame to communicate with devices serviced by that AP. Before transmitting an MU-MIMO frame, the AP may need to notify the devices of the transmission. Typically, a request to send (RTS) and a clear to send (CTS) mechanism may be employed to communicate between devices when data frames are available for transmission. For example, a transmitting device may initiate the RTS/CTS mechanism by transmitting an RTS frame to a destination device. The destination device may reply with a CTS frame. After receiving the CTS frame, the transmitting device sends data to the destination device. After successful reception, the destination device replies with an acknowledgement frame (ACK). However, the RTS/CTS mechanism may be employed from one device to another device and not to multiple devices.

Example embodiments of the present disclosure relate to systems, methods, and devices for a multiple user setup frame.

In some demonstrative embodiments, one or more devices may be configured to communicate an MU-MIMO frame, for example, over a 60 GHz frequency band. The one or more devices may be configured to communicate in a mixed environment such that one or more legacy devices are able to communicate with one or more non-legacy devices. That is, devices following one or more IEEE 802.11 specifications may communicate with each other regardless of which IEEE 802.11 specification is followed.

A directional multi-gigabyte (DMG) communications may involve one or more directional links to communicate at a rate of multiple gigabits per second; for example, at least 1 gigabit per second, 7 gigabits per second, or any other rate. An amendment to a DMG operation in a 60 GHz band, e.g., according to an IEEE 802.11ad standard, may be defined, for example, by an IEEE 802.11 ay project.

In some demonstrative embodiments, one or more devices may be configured to communicate over a next generation 60 GHz (NG60) network, an extended DMG (EDMG) network, and/or any other network. For example, the one or more devices may be configured to communicate over the NG60 or EDMG networks.

In some demonstrative embodiments, one or more devices may be configured to support the one or more mechanisms and/or features in a backward compatible manner, for example, in a manner which may be compatible with one or more devices ("legacy devices"), which may not support these mechanisms and/or features, such as one or more non-EDMG devices (e.g., devices configured according to an IEEE 802.11ad standard), and the like. In one example, a legacy device, (e.g., a DMG device) may include, may comply with, and/or may be configured according to a first specification, for example, an IEEE 802.11ad specification, while a non-legacy device, for example, an EDMG device, may include, may comply with, and/or may be configured according to a second specification, for example, an IEEE 802.11ay specification.

In some demonstrative embodiments, a device may be configured to send a setup frame (e.g., an MU-MIMO setup frame) before transmitting an MU-MIMO frame in order to notify other devices of the upcoming MU-MIMO frame. The MU-MIMO setup frame may be configured to inform a plurality of destination devices that they are to be the recipients of the upcoming MU-MIMO frame.

In some demonstrative embodiments, an RTS frame may be utilized for the MU-MIMO setup frame. That is, instead of defining a new frame to perform the functions of the MU-MIMO setup frame, for example, it may be beneficial to at least preserve the behavior of legacy devices when receiving the RTS frame. A device may be configured to transmit the MU-MIMO setup frame, for example, using a structure in accordance with a legacy RTS frame. This may allow for operation in a mixed environment between legacy and non-legacy devices.

In some demonstrative embodiments, the MU-MIMO setup frame may be configured to indicate a plurality of devices (e.g., a high number of devices) which may allow supporting all the devices that can be addressed in an MU-MIMO transmission (e.g., a UL MU-MIMO).

In some demonstrative embodiments, a device may be configured to use an RTS/MU-MIMO setup frame, for example, to at least initiate a transmit opportunity (TxOP), where a higher number of devices will be addressed, either in one physical layer convergence protocol (PLCP) protocol data unit (PPDU) or in a burst of multiple PPDUs, with possibly different devices in different PPDUs. It is understood that the TxOP defines a transmission period, which may be a bounded time interval during which a device may send as many frames as possible (as long as the duration of the transmissions does not extend beyond the maximum duration of the TxOP).

In some demonstrative embodiments, a device may be configured to use a media access control (MAC) frame, which may have a structure compatible with a legacy RTS frame, for example, with one or more possible modifications. The one or more possible modifications may be including multiple destination identifiers (IDs) in the MAC frame instead of a single destination ID. For example, the device may be configured to transmit a control field, such as a PHY-layer control trailer, after a MAC payload.

In some demonstrative embodiments, the control field may include a "hidden" control field, which may be, for example, hidden from legacy stations, and visible to and/or accessible by, non-legacy stations (e.g., EDMG stations). The PHY-layer control trailer may be configured to include additional information, such as remaining new information for an MU-MIMO setup frame, which was not included in the MAC payload.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment of an MU-MIMO setup frame, according to some example embodiments of the present disclosure. Wireless network 100 may include one or more user device (s) 120 and one or more access point(s) (AP) 102, which may communicate in accordance with IEEE 802.11 communication standards, such as the IEEE 802.11ad and/or IEEE 802.11ay specifications. The user device(s) 120 may be mobile devices that are non-stationary and do not have fixed locations.

Figure 6:
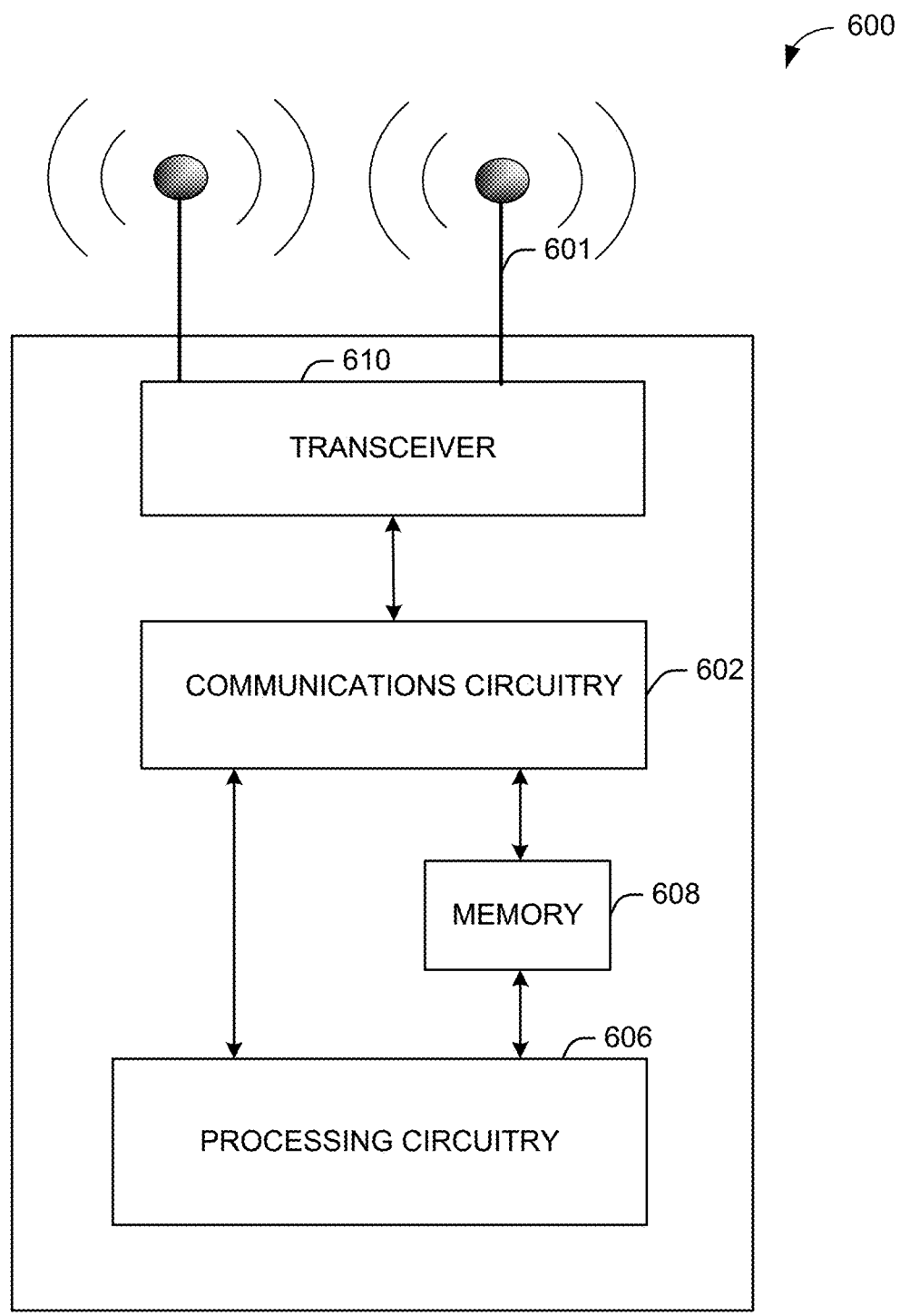
FIG. 6 illustrates a functional diagram of an example communication station that may be suitable for use as a user device, in accordance with some demonstrative embodiments.
Figure 7:
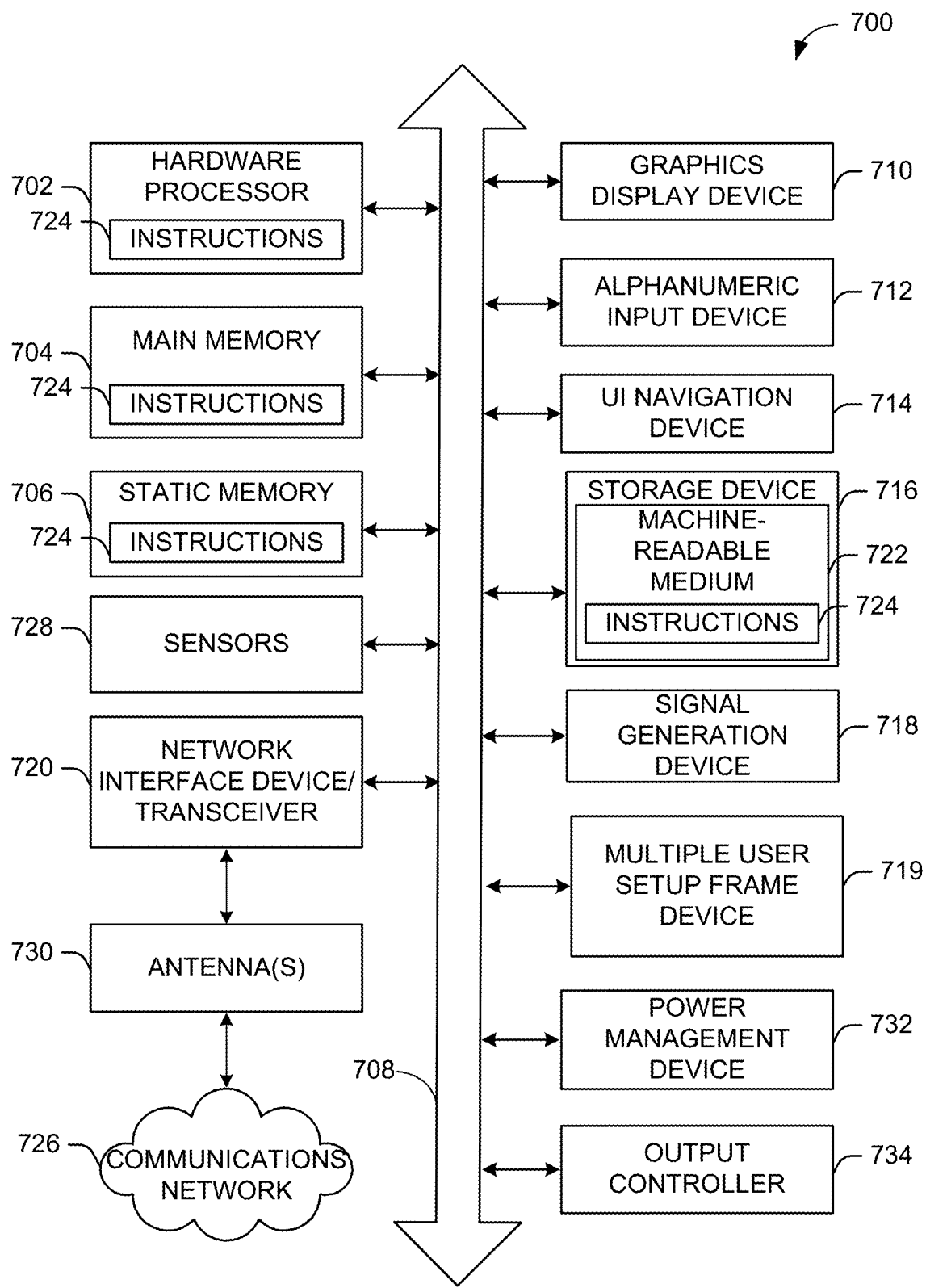
FIG. 7 is a block diagram of an example machine upon which any of one or more techniques (e.g., methods) may be performed, in accordance with some demonstrative embodiments.

In some embodiments, the user device(s) 120 and the AP 102 may include one or more computer systems similar to that of the functional diagram of FIG. 6 and/or the example machine/system of FIG. 7.

One or more illustrative user device(s) 120 and/or the AP 102 may be operable by one or more user(s) 110. The user device(s) 120 (e.g., 124, 126, or 128) and/or the AP 102 may include any suitable processor-driven device including, but not limited to, a mobile device or a non-mobile (e.g., a static, device). For example, user device(s) 120 and/or the AP 102 may include a DMG device, an EDMG device, a UE, an MD, a station (STA), an access point (AP), a personal computer (PC), a wearable wireless device (e.g., a bracelet, a watch, glasses, ring, etc.), a desktop computer, a mobile computer, a laptop computer, an ultrabook computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but are not limited to, any one of a combination of different types of suitable communications networks such as, for example, broadcasting networks, cable networks, public networks (e.g., the Internet), private networks, wireless networks, cellular networks, or any other suitable private and/or public networks.

Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and the AP 102 may include one or more communications antennas. A communications antenna may be any suitable type of antenna corresponding to the communications protocols used by the user device(s) 120 (e.g., user devices 124, 126 and 128), and the AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user device(s) 120.

Any of the user device(s) 120 (e.g., user devices 124, 126, 128), and/or the AP 102 may include any suitable radio and/or transceiver for transmitting and/or receiving radio frequency (RF) signals in the bandwidth and/or channels corresponding to the communications protocols utilized by any of the user device(s) 120 and/or the AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHz channels (e.g., 802.11ad). In some embodiments, non-Wi-Fi protocols may be used for communications between devices, such as Bluetooth, dedicated short-range communication (DSRC), ultra-high frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

Some demonstrative embodiments may be used in conjunction with a wireless communication network communicating over a frequency band of 60 GHz. However, other embodiments may be implemented utilizing any other suitable wireless communication frequency bands, for example, an extremely high frequency (EHF) band (the millimeter wave (mmWave) frequency band), a frequency band within the frequency band of between 20 GHz and 300 GHz, a WLAN frequency band, a WPAN frequency band, a frequency band according to the WGA specification, and the like.

The phrases "directional multi-gigabit (DMG)" and "directional band (DBand)", as used herein, may relate to a frequency band wherein the channel starting frequency is above 45 GHz. In one example, DMG communications may involve one or more directional links to communicate at a rate of multiple gigabits per second, for example, at least 1 gigabit per second, 7 gigabits per second, or any other rate.

In some demonstrative embodiments, the user device(s) 120 and/or the AP 102 may be configured to operate in accordance with one or more specifications, including one or more IEEE 802.11 specifications, (e.g., an IEEE 802.11ad specification, an IEEE 802.11ay specification, and/or any other specification and/or protocol). For example, an amendment to a DMG operation in the 60 GHz band, according to an IEEE 802.11ad standard, may be defined, for example, by an IEEE 802.11ay project.

Some communications over a wireless communication band (e.g., a DMG band) may be performed over a single channel bandwidth (BW). For example, the IEEE 802.11ad specification defines a 60 GHz system with a single channel bandwidth (BW) of 2.16 GHz, which is to be used by all stations (STAs) for both transmission and reception.

In some demonstrative embodiments, devices 102 and/or 140 may be configured to implement one or more mechanisms to extend a single-channel BW scheme (e.g., according to the IEEE 802.11ad specification) for higher data rates and/or increased capabilities.

Some specifications (e.g., an IEEE 802.11ad specification) may be configured to support a single user (SU) system, in which a station (STA) cannot transmit frames to more than a single STA at a time. Such specifications may not be able to support a STA transmitting to multiple STAs simultaneously, using a multi-user MIMO (MU-MIMO) scheme (e.g., a downlink (DL) MU-MIMO), or any other MU scheme.

In some demonstrative embodiments, the user device(s) 120 and/or the AP 102 may be configured to implement one or more multi-user (MU) mechanisms. For example, the user device(s) 120 and/or the AP 102 may be configured to implement one or more MU mechanisms, which may be configured to enable MU communication of downlink (DL) frames using a multiple-input-multiple-output (MIMO) scheme between a device (e.g., AP 102) and a plurality of user devices, including user device(s) 120 and/or one or more other devices.

In some demonstrative embodiments, the user devices 120 and/or AP 102 may be configured to communicate over a next generation 60 GHz (NG60) network, an extended DMG (EDMG) network, and/or any other network. For example, the user devices 120 and/or AP 102 may be configured to communicate MIMO transmissions (e.g., DL MU-MIMO) and/or use channel bonding for communicating over the NG60 and/or EDMG networks.

In some demonstrative embodiments, the user devices 120 and/or AP 102 may be configured to support one or more mechanisms and/or features (e.g., channel bonding, single user (SU) MIMO, and/or ulti user (MU) MIMO) in accordance with an EDMG standard, an IEEE 802.11ay standard and/or any other standard and/or protocol.

When an AP (e.g., AP 102) establishes communication with one or more user device(s) 120 (e.g., user devices 124, 126, and/or 128), the AP 102 may communicate in a downlink direction, and the user device(s) 120 may communicate with the AP 102 in an uplink direction by sending frames in either direction. The frames may include one or more headers. These headers may be used to allow a device (e.g., the user device(s) 120 and/or the AP 102) to detect a new incoming frame from another device.

In one embodiment, and with reference to FIG. 1, a device (e.g., the user device(s) 120 and/or the AP 102) may be configured to communicate an MU-MIMO frame, for example, over a 60 GHz frequency band. The user device(s) 120 and/or the AP 102 may be configured to support the one or more mechanisms and/or features in a backward compatible manner, for example, in a manner which may be compatible with one or more devices ("legacy devices"), which may not support these mechanisms and/or features, such as one or more non-EDMG devices (e.g., devices configured according to an IEEE 802.11ad standard) and the like. An EDMG device may be a device whose radio transmitter is capable of transmitting and receiving EDMG physical layer (PHY) protocol data units (PPDUs). In one example, a legacy device (e.g., a DMG device) may include, may comply with, and/or may be configured according to a first specification (e.g., an IEEE 802.11ad specification), while a non-legacy device (e.g., an EDMG device) may include, may comply with, and/or may be configured according to a second specification (e.g., an IEEE 802.11ay specification).

In some embodiments, a device (e.g., the user device(s) 120 and/or the AP 102) may be configured to send a setup frame, (e.g., an MU-MIMO setup frame) before transmitting an MU-MIMO frame in order to notify other devices of the MU-MIMO frame. The MU-MIMO setup frame may be configured to inform a plurality of destination devices that they are to be the recipients of the upcoming MU-MIMO frame. For example, the AP 102 may wish to communicate with user devices 124, 126, and 128 by sending an MU-MIMO frame. Before sending the MU-MIMO frame, the AP 102 may utilize RTS frame 140 to act as an MU-MIMO setup frame and to notify the user devices 124, 126, and 128 of the upcoming MU-MIMO frame. The RTS frame 140 may include information that may be addressed to user devices 124, 126, and 128. The RTS frame 140 may be backward-compatible with legacy devices such that the RTS frame 140 may at least preserve the behavior of legacy devices when receiving the RTS frame. This may allow for operation in a mixed environment between legacy and non-legacy devices.

In one embodiment, a device (e.g., the user device(s) 120 and/or the AP 102) may be configured to use the RTS frame 140 as an MU-MIMO setup frame, for example, to at least initiate a transmit opportunity (TxOP). An example is where a higher number of devices will be addressed, either in one physical layer convergence protocol (PLCP) protocol data unit (PPDU) or in a burst of multiple PPDUs, with possibly different devices in different PPDUs.

In another embodiment, a device (e.g., the user device(s) 120 and/or the AP 102) may be configured to use a MAC frame, which may have a structure compatible with a legacy RTS frame (e.g., the RTS frame 140) with one or more possible modifications. The one or more possible modifications may be including multiple destination identifiers (IDs) in the MAC frame instead of a single destination ID. For example, the device may be configured to transmit a control field, such as a PHY-layer control trailer, after a MAC payload.

In some demonstrative embodiments, the control field may include a "hidden" control field, which may be, for example, hidden from legacy stations, and visible to and/or accessible by, non-legacy stations (e.g., EDMG stations). The PHY-layer control trailer may be configured to include additional information, such as remaining new information for an MU-MIMO setup frame, which was not included in the MAC payload. In some embodiments, when at least one of the one or more user devices 120 receives the RTS frame 140, the at least one of the one or more user device 120 may respond with a clear to send (CTS) frame 146, which indicates to the AP 102 that it can start sending the MU-MIMO frame. It is understood that the above descriptions are for purposes of illustration and are not meant to be limiting.

Figure 2:
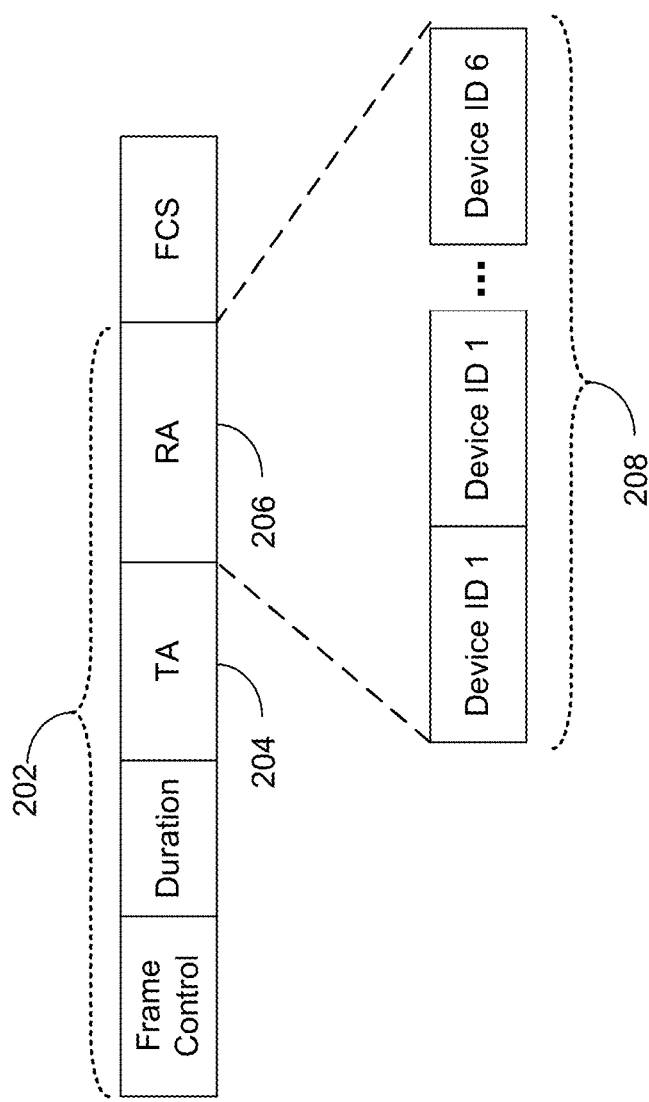
FIG. 2 depicts an illustrative schematic diagram of a media access control (MAC) frame, in accordance with some demonstrative embodiments.

FIG. 2 depicts an illustrative schematic diagram of a MAC frame 200, in accordance with some demonstrative embodiments.

As shown in FIG. 2, the MAC frame 200 may include a MAC header 202. The MAC header 202 may include various fields (e.g., frame control, duration, transmitting device address (TA) 204, and destination device address (RA) 206). The MAC frame 200 may represent an MU-MIMO setup frame in the structure of an RTS frame, in accordance with one or more example embodiments of the present disclosure.

The MAC header 202 may be compatible with the structure of a MAC header for a legacy device. The MAC header 202 may include the TA field 204 and the RA field 206 in a reversed order. That is, in the MAC header 202, the TA field 204 comes before the RA field 206. The MAC header of a legacy device may have the RA field before the TA field. Utilizing a MAC frame 200 with a MAC header 202 preserves backward compatibility with non-legacy devices. Legacy devices receiving this MAC header 202 may still be able to decode the MAC header 202 with the exception to the TA field 204 and the RA field 206.

In one embodiment, the RA field 206 may be configured to include a plurality of device IDs (e.g., device IDs 208). This is in contrast to a legacy MAC frame having an RA address field containing a single destination address. In other embodiments, the RA field 206 may not include a plurality of device IDs.

In some demonstrative embodiments, as shown in FIG. 2, the MAC frame 200 may be configured to include, for example, up to six device IDs (e.g., device IDs 208). It should be understood that although this example shows that the MAC frame 200 may include up to six device IDs, the MAC frame 200 may be configured to include less than six device IDs or more than six device IDs.

In some demonstrative embodiments, as shown in FIG. 2, the RA field 206 may have a length (e.g., 6 octets) configured to include the plurality of device IDs (e.g., device IDs 208) to identify a respective plurality of destination devices. For example, in this MAC frame 200, an AP may send a downlink (DL) MU-MIMO transmission containing, for example, device IDs for six destination devices.

In some demonstrative embodiments, configuring the MAC frame to include the RA field after the TA field may allow, for example, to avoid a situation, in which a concatenation of the device IDs in the RA field (e.g., a concatenation of the six device IDs) may match another full device ID. It is understood that the above descriptions are for purposes of illustration and are not meant to be limiting.

Figure 3:
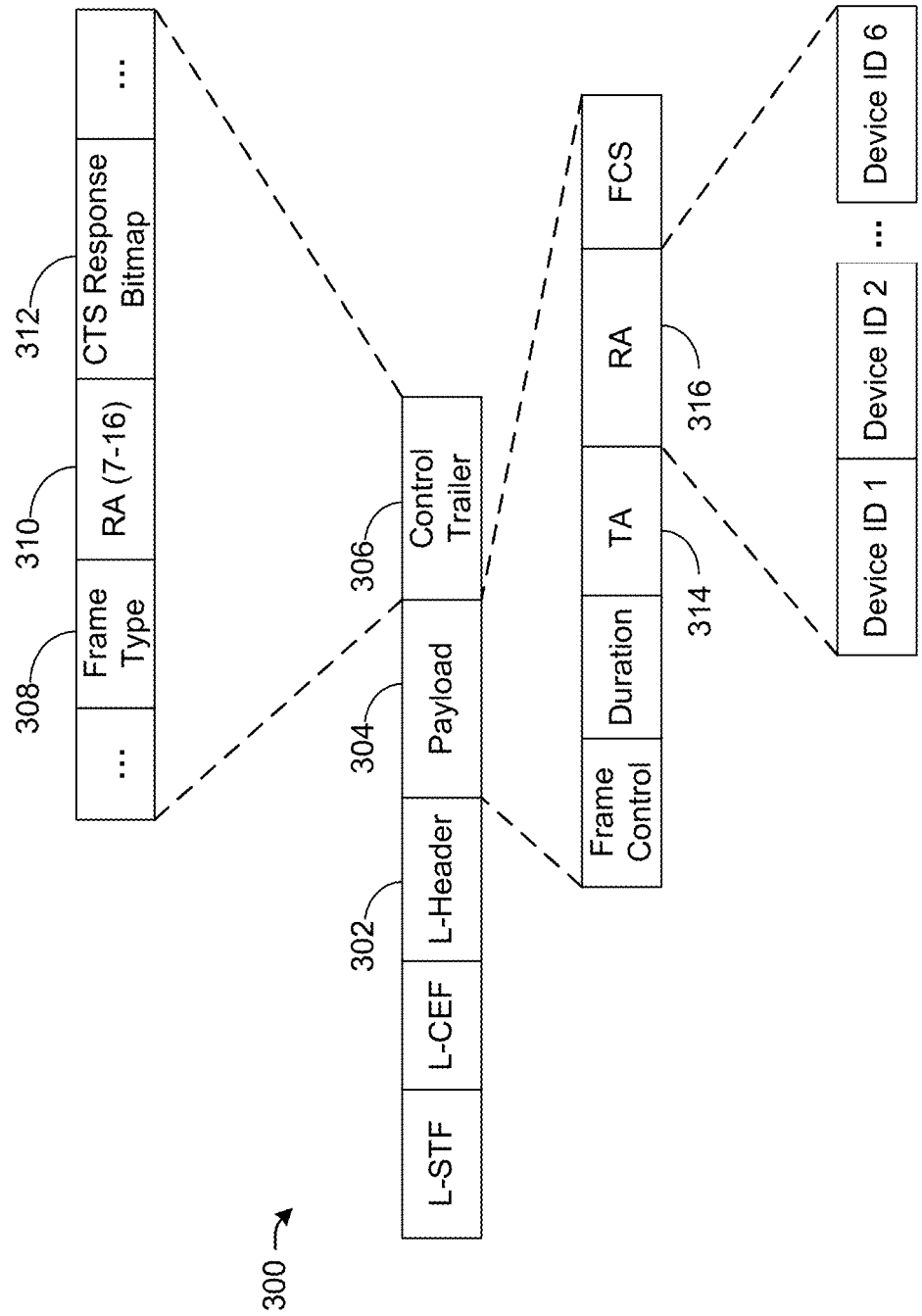
FIG. 3 depicts an illustrative schematic diagram of an MU-MIMO setup frame, in accordance with some demonstrative embodiments.

FIG. 3 is a schematic illustration of an MU-MIMO setup frame, in accordance with some demonstrative embodiments.

In some demonstrative embodiments, a larger number of destination device IDs may be included in a frame sent from a transmitting device (e.g., the user devices 120 and/or the AP 102 of FIG. 1) to a destination device (e.g., the user devices 120 and/or the AP 102 of FIG. 1). For example, the MU-MIMO setup frame may be configured to enable signaling up to 16 devices, or any other number, that may participate in an MU-MIMO transmission. For example, an EDMG device (e.g., the user devices 120 and/or the AP 102 of FIG. 1) may send an EDMG transmission, such as an MU-MIMO setup frame 300, to one or more devices (e.g., the user devices 120 and/or the AP 102 of FIG. 1). The MU-MIMO setup frame 300 may indicate the destination devices addressed by a PPDU. The MU-MIMO setup frame 300 may be comprised of one or more legacy fields such as a legacy (e.g., non-EDMG) short training field (L-STF), a legacy (e.g., non-EDMG) channel estimation field (L-CEF), and a legacy header (L-Header) 302. The legacy header 302 may be a PHY header. The MU-MIMO setup frame 300 may include a MAC payload 304 and a control trailer 306. The control trailer 306 may be a PHY layer control trailer field that follows the MAC payload 304. The existence of the control trailer 306 may be signaled by one or more reserved bits in the legacy header 302 of the MU-MIMO setup frame 300, or by any other one or more bits in any other fields of the MU-MIMO setup frame 300. The control trailer 306 may include additional new information for the MU-MIMO setup frame 300. In the alternative, the control trailer 306 may include at least in part one or more device IDs.

In some embodiments, the MU-MIMO setup frame 300 may have a structure compatible with a structure of an RTS frame (e.g., a legacy RTS frame). In case one or more legacy devices receive the MU-MIMO setup frame 300, the legacy devices may ignore the control trailer 306 and may treat the MU-MIMO setup frame 300 as if it is a legacy RTS frame.

In some demonstrative embodiments, the control trailer 306 may include, but is not limited to, a frame type field 308, an RA field 310, and a CTS response bitmap field 312. It is understood that although the control trailer 306 shows the above fields, the control trailer 306 may include other or additional fields to perform the one or more embodiments of the present disclosure. For example, the control trailer 306 may include fields to indicate whether the TA field 314 and the RA field 316 in the MAC payload 304 are inverted or not.

The frame type field 308 may be, for example, configured to code a specific format for the control trailer 306. For example, the frame type field 308 may indicate a description of one or more different fields in the control trailer 306. In one example, the frame type field 308 may identify information fields to be included in the control trailer 306 such that information fields may indicate when the control trailer 306 may be used for other purposes. The frame type field 308 may be configured to define, for example, a particular format for the control trailer 306 such as an MU-MIMO setup frame 300.

In some demonstrative embodiments, the RA field 310 may include the destination IDs for a plurality of devices that may be addressed with the MU-MIMO setup frame 300. In other words, the RA field 316 of the MAC payload 304 may include a first plurality of device IDs, and the RA field 310 of the control trailer 306 may include a second plurality of device IDs. For example, device IDs of a plurality of destination devices of an MU-MIMO transmission may be distributed between the RA field 316 of the MAC payload 304, and the RA field 310 of the control trailer 306. However, it should be understood that in some scenarios, the first plurality of device IDs, and the second plurality of device IDs may all be included in the RA field 316 or may all be included in the RA field 310, or any combination thereof For example, the MU-MIMO setup frame 300 may be configured to support up to 16 destination devices i, where i=1 . . . 16. According to this example, the RA field 316 of the MAC payload 304 may be configured to include the device IDs of the destination devices 1 to 6, and the RA field 310 of the control trailer 306 may be configured to include the device IDs of the destination devices 7 to 16. However, it should be understood that in some scenarios, the first RA field of the MAC header may not include device IDs of the destination devices 1 to 6 instead, these device IDs and additional device IDs may be included in the second RA field of the control trailer. For example, device IDs of the destination devices 1 through 8 may be included in the second RA field of the control trailer. It should be understood that any combination of device IDs may be divided between the first RA field of the MAC header and the second RA field of the control trailer. It is understood that the above descriptions are for purposes of illustration and are not meant to be limiting.

In some demonstrative embodiments, the control trailer 306 may include, at least in part, a clear to send (CTS) response bitmap field 312, following the RA field 310. Although the example in FIG. 3 shows the CTS response bitmap field 312 following the RA field 310, it should be noted that this is only for illustrative purposes and not to be considered as limiting. The CTS response bitmap field 312 may be specified at a different location within the control trailer 306. The CTS response bitmap field 312 may be configured to indicate which destination devices must respond to the MU-MIMO setup frame 300. These destination devices indicated in the CTS response bitmap field 312 may respond, for example, with a CTS, a DMG CTS, or an acknowledgement (ACK), or any other frame or message, assuming the CTS response bitmap field 312 designates two bits for each destination device. For example, if the two bits designated for the device ID 1 is set to "00," this value may indicate to the destination device 1 that no CTS is requested. If, for example, the bits designated for the device ID 1 is set to "01," this may indicate to the destination device 1 that the CTS is requested. If the bits are set to "10," this may indicate to the destination device 1 that the CTS will be polled. Lastly, bits "11" may be reserved for other use. It is understood that the above descriptions are for purposes of illustration and are not meant to be limiting.

In some demonstrative embodiments, the MU-MIMO setup frame 300 may be utilized to create a TxOP and to schedule various destination devices in different successive PPDUs within the TxOP. In that case, the control trailer 306 may be configured to include, for example, scheduling information, which may enable a scheduling of multiple destination devices in different PPDUs during the TxOP. The control trailer 306 may include, for example, on a per PPDU basis, an indication of the one or more destination devices that will be addressed in the MU-MIMO setup frame 300, and/or a target time for the PPDU. In other embodiments, the control trailer 306 may include any one or more additional or alternative fields (e.g., to signal any additional information). It is understood that the above descriptions are for purposes of illustration and are not meant to be limiting.

Figure 4:
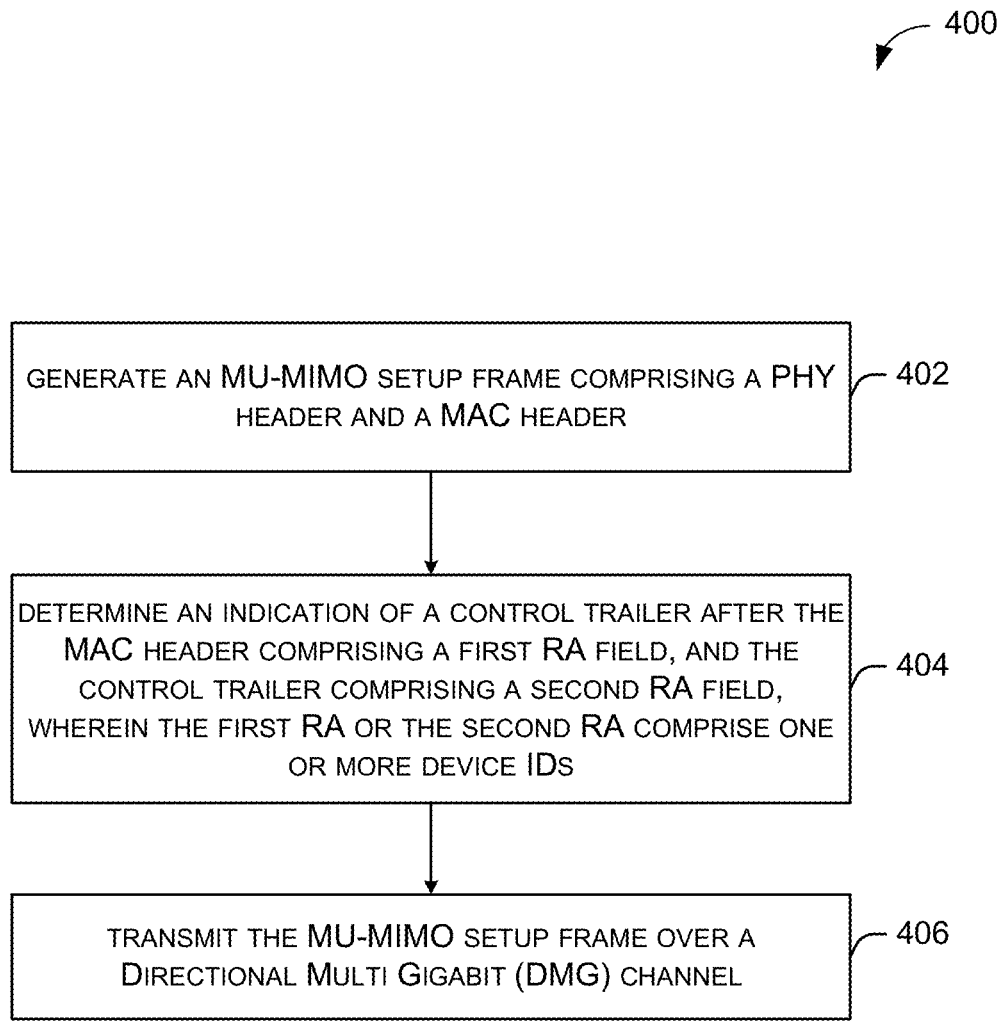
FIG. 4 depicts a flow diagram of an illustrative process for an illustrative MU-MIMO setup frame system, in accordance with some demonstrative embodiments.

FIG. 4 illustrates a flow diagram of illustrative process 400 for an illustrative MU-MIMO setup frame system, in accordance with some demonstrative embodiments.

At block 402, a device (e.g., the user device(s) 120 and/or the AP 102 of FIG. 1) may generate a multiuser multiple-input and multiple-output (MU-MIMO) setup frame. The MU-MIMO setup frame may include at least in part a physical layer (PHY) header and a media access control (MAC) header.

At block 404, the device may determine an indication of a control trailer after the MAC header. The MAC header may comprise a first receive address (RA) field comprising one or more first device identifiers (IDs). The control trailer may comprise a second RA field that may include one or more second device IDs. The device may be configured to send the MU-MIMO setup frame before transmitting an MU-MIMO frame in order to notify other devices of the upcoming MU-MIMO frame. The MU-MIMO setup frame may be configured to inform a plurality of destination devices that they are to be the recipients of the upcoming MU-MIMO frame. In some examples, an RTS frame may be utilized for the MU-MIMO setup frame. That is, instead of defining a new frame to perform the functions of the MU-MIMO setup frame, for example, it may be beneficial to at least preserve the behavior of legacy devices when receiving the RTS frame. The MU-MIMO setup frame may be configured to indicate a plurality of devices (e.g., a high number of devices), which may allow, for example, supporting all the devices that can be addressed in an MU-MIMO transmission (e.g., an UL MU-MIMO).

In some embodiments, the control trailer may comprise scheduling information to schedule at least one of a plurality of devices in a plurality of successive physical layer convergence protocol (PLCP) protocol data units (PPDUs) within a transmit opportunity (TxOP).

In some demonstrative embodiments, the control field may be accessible by non-legacy stations (e.g., EDMG stations). The PHY-layer control trailer may be configured to include additional information, such as remaining new information for an MU-MIMO setup frame, which was not included in the MAC payload. The MU-MIMO setup frame may be configured to support up to 16 destination devices i, where i=1 . . . 16. According to this example, the first RA field of the MAC header may be configured to include the device IDs of destination devices 1 to 6, and the second RA field of the control trailer may be configured to include the device IDs of the destination devices 7 to 16.

At block 406, the device may cause to send the MU-MIMO setup frame over a directional multi-gigabit (DMG) channel. The device may transmit the MU-MIMO setup frame, for example, using a structure in accordance with a legacy RTS frame. This may allow for operation in a mixed environment between legacy and non-legacy devices.

Figure 5:
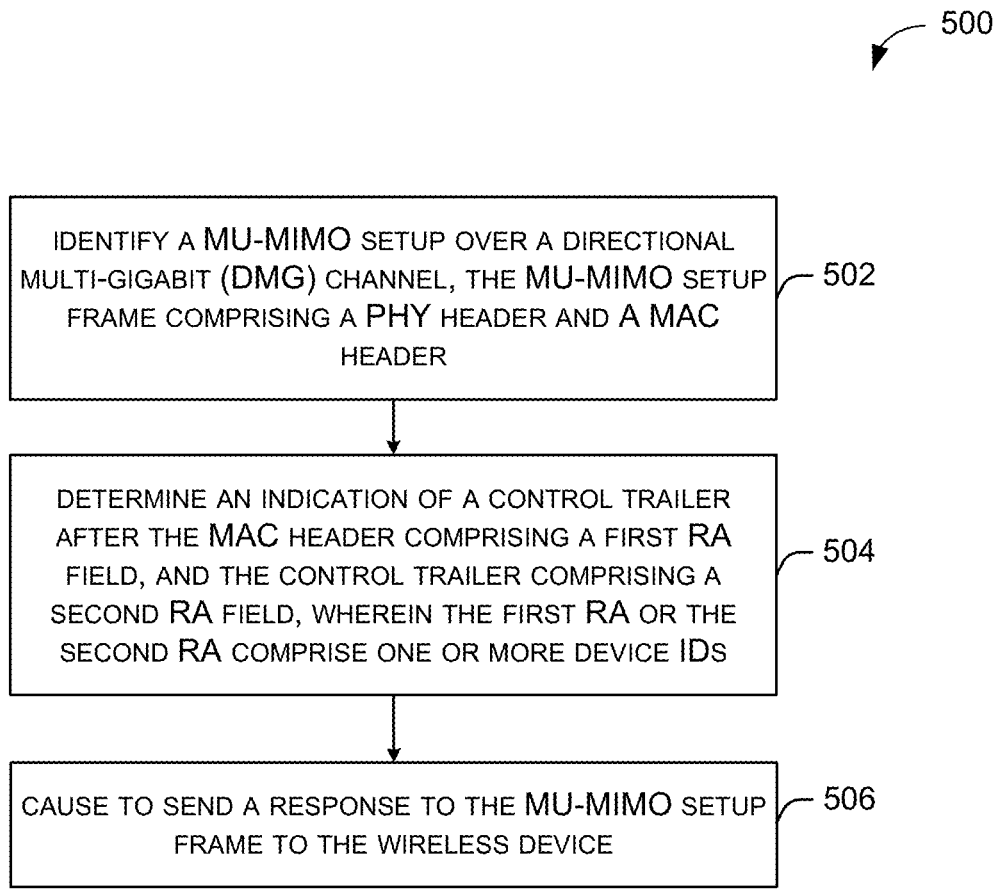
FIG. 5 depicts a flow diagram of an illustrative process for an illustrative MU-MIMO setup frame system, in accordance with some demonstrative embodiments.

FIG. 5 illustrates a flow diagram of illustrative process 500 for an illustrative MU-MIMO setup frame system, in accordance with some demonstrative embodiments.

At block 502, a device (e.g., the user device(s) 120 and/or the AP 102 of FIG. 1) may identify an MU-MIMO setup frame received from another device (e.g., the user devices 120 and/or the AP 102 of FIG. 1) over a directional multi-gigabit (DMG) channel. The MU-MIMO setup frame may include a PHY header and a MAC header.

At block 504, the device may determine an indication of a control trailer in the PHY header after the MAC header. In some embodiments, the MU-MIMO setup frame may have a structure compatible with a structure of an RTS frame (e.g., a legacy RTS frame). In case one or more legacy devices receive the MU-MIMO setup frame, the legacy devices may ignore the control trailer 306 and may treat the MU-MIMO setup frame 300 as if it is a legacy RTS frame. The control trailer may include, but is not limited to, a frame type field, an RA field, and a CTS response bitmap field.

Although the control trailer includes the above fields, the control trailer may include other or additional fields to perform the one or more embodiments of the present disclosure. For example, the control trailer may include fields to indicate whether the TA field and the RA field in the MAC payload are inverted or not.

The frame type field may be, for example, configured to code a specific format for the control trailer. For example, the frame type field may indicate a description of one or more different fields in the control trailer. In one example, the frame type field may identify information fields to be included in the control trailer such that information fields may indicate when the control trailer may be used for other purposes. The frame type field may be configured to define, for example, a particular format for the control trailer such as an MU-MIMO setup frame.

In some demonstrative embodiments, the RA field may include the destination IDs for a plurality of devices that may be addressed with the MU-MIMO setup frame. This RA field included in the control trailer may represent a second group of device IDs.

In other words, the RA field of the MAC payload 304 may include a first plurality of device IDs, and the RA field of the control trailer 306 may include a second plurality of device IDs. For example, the device IDs of a plurality of destination devices of an MU-MIMO transmission may be distributed between the RA field of the MAC payload and the RA field of the control trailer.

At block 506, the device may send a response to the MU-MIMO setup frame to the other device.

FIG. 6 shows a functional diagram of an exemplary communication station 600, in accordance with some demonstrative embodiments. In one embodiment, FIG. 6 illustrates a functional block diagram of a communication station that may be suitable for use as an AP 102 (FIG. 1) or a user device 120 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 1-5.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices, and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs), and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, the alphanumeric input device 712, and the UI navigation device 714 may be a touch screen display. The machine 700 may additionally include a storage device (i.e., drive unit) 716, a signal generation device 718 (e.g., a speaker), a multiple user setup frame device 719, a network interface device/transceiver 720 coupled to antenna (s) 730, and one or more sensors 728, such as a global positioning system (GPS) sensor, a compass, an accelerometer, or other sensor. The machine 700 may include an output controller 734, such as a serial connection (e.g., universal serial bus (USB), parallel, or other wired or wireless (e.g., infrared (IR), near field communication (NFC), etc.) to communicate with or control one or more peripheral devices (e.g., a printer, a card reader, etc.)).

The storage device 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The multiple user setup frame device 719 may carry out or perform any of the operations and processes (e.g., processes 400 and 500) described and shown above. For example, the multiple user setup frame device 719 may be configured to communicate an MU-MIMO frame, for example, over a 60 GHz frequency band. The multiple user setup frame device 719 may be configured to communicate in a mixed environment such that the multiple user setup frame device 719 may allow one or more legacy devices to communicate with one or more non-legacy devices. That is, devices following one or more IEEE 802.11 specifications may communicate with each other regardless of which IEEE 802.11 specification is followed.

The multiple user setup frame device 719 may be configured to communicate over a next generation 60 GHz (NG60) network, an enhanced directional multi-gigabit (EDMG) network, and/or any other network. For example, the multiple user setup frame device 719 may be configured to communicate over the NG60 or EDMG networks.

The multiple user setup frame device 719 may be configured to support the one or more mechanisms and/or features in a backward compatible manner, for example, in a manner which may be compatible with one or more devices ("legacy devices"), which may not support these mechanisms and/or features, such as one or more non-EDMG devices (e.g., devices configured according to an IEEE 802.11ad standard), and the like. In one example, a legacy device (e.g., a DMG device) may include, may comply with, and/or may be configured according to a first specification (e.g., an IEEE 802.11ad specification), while a non-legacy device (e.g., an EDMG device) may include, may comply with, and/or may be configured according to a second specification (e.g., an IEEE 802.11ay specification).

The multiple user setup frame device 719 may be configured to send a setup frame, (e.g., an MU-MIMO setup frame) before transmitting an MU-MIMO frame in order to notify other devices of the MU-MIMO frame. The MU-MIMO setup frame may be configured to inform a plurality of destination devices that they are to be the recipients of the upcoming MU-MIMO frame.

The multiple user setup frame device 719 may be configured to utilize an RTS frame for the MU-MIMO setup frame. That is, instead of defining a new frame to perform the functions of the MU-MIMO setup frame, for example, it may be beneficial to at least preserve the behavior of legacy devices when receiving the RTS frame. The multiple user setup frame device 719 may be configured to transmit the MU-MIMO setup frame, for example, using a structure in accordance with a legacy RTS frame. This may allow for operation in a mixed environment between legacy and non-legacy devices.

The multiple user setup frame device 719 may configure the MU-MIMO setup frame to indicate a plurality of devices (e.g., a high number of devices), which may allow supporting all the devices that can be addressed in an MU-MIMO transmission (e.g., a UL MU-MIMO).

The multiple user setup frame device 719 may be configured to use an RTS/MU-MIMO setup frame, for example, to at least initiate a transmit opportunity (TxOP), where a higher number of devices will be addressed, either in one physical layer convergence protocol (PLCP) protocol data unit (PPDU) or in a burst of multiple PPDUs, with possibly different devices in different PPDUs.

The multiple user setup frame device 719 may be configured to use a media access control (MAC) frame, which may have a structure compatible with a legacy RTS frame, for example, with one or more possible modifications. The one or more possible modifications may be including multiple destination identifiers (IDs) in the MAC frame instead of a single destination ID. For example, the multiple user setup frame device 719 may be configured to transmit a control field, such as a PHY-layer control trailer, after a MAC payload.

The multiple user setup frame device 719 may determine that the control field may include a "hidden" control field, which may be, for example, hidden from legacy stations, and visible to and/or accessible by, non-legacy stations (e.g., EDMG stations). The PHY-layer control trailer may be configured to include additional information, such as remaining new information for an MU-MIMO setup frame, which was not included in the MAC payload.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM), random access memory (RAM), magnetic disk storage media, optical storage media, a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone service (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes (e.g., processes 400 and 500) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one-way and/or two-way radio communication systems, cellular radio-telephone communication systems, a mobile phone, a cellular telephone, a wireless telephone, a personal communication systems (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communication (GSM), 2G, 2.5G, 3G, 3.5G, 4G, fifth generation (5G) mobile networks, 3GPP, long term evolution (LTE), LTE advanced, enhanced data rates for GSM evolution (EDGE), or the like. Other embodiments may be used in various other devices, systems, and/or networks.

According to example embodiments of the disclosure, there may be a device. The device may include at least one memory that stores computer-executable instructions, and at least one processor of the one or more processors configured to access the at least one memory, wherein the at least one processor of the one or more processors is configured to execute the computer-executable instructions to may include a physical layer (PHY) header and a media access control (MAC) header. The at least one processor of the one or more processors may be configured to execute the computer-executable instructions to determine an indication of a control trailer after the MAC header, the MAC header may include a first receive address (RA) field, and the control trailer may include a second RA field, wherein the first RA or the second RA comprise one or more device identifiers (IDs). The at least one processor of the one or more processors may be configured to execute the computer-executable instructions to cause to send the MU-MIMO setup frame over a directional multi-gigabit (DMG) channel.

The implementations may include one or more of the following features. The MAC header may include a transmit address (TA) field, wherein the TA field is located ahead of the first RA field. The first RA field is configured to contain one or more first device IDs of the one or more device IDs. The second RA field is configured to contain one or more second device IDs of the one or more device IDs. The control trailer may include a clear to send (CTS) response bitmap, the CTS response bitmap, including one or more bits, wherein the one or more bits are associated with at least one of the one or more device IDs. At least one of the one or more bits indicate if a first device is to send a response to the MU-MIMO setup frame, wherein the first device is associated with at least one of the one or more device IDs. The control trailer may include scheduling information to schedule at least one of a plurality of devices in a plurality of successive physical layer convergence protocol (PLCP) protocol data units (PPDUs) within a transmit opportunity (TxOP). The MU-MIMO setup frame has a structure compatible with a DMG request to send (RTS) frame structure. The device may include a transceiver configured to transmit and receive wireless signals. The device may include one or more antennas coupled to the transceiver.

According to example embodiments of the disclosure, there may be a non-transitory computer-readable medium storing computer-executable instructions which, when executed by a processor, cause the processor to perform operations. The operations may include identifying a multiuser multiple-input and multiple-output (MU-MIMO) setup frame received from a wireless device over a directional multi-gigabit (DMG) channel, the MU-MIMO setup frame comprising a physical layer (PHY) header and a media access control (MAC) header. The operations may include determining an indication of a control trailer after the MAC header, the MAC header comprising a first receive address (RA) field, and the control trailer comprising a second RA field, wherein the first RA or the second RA comprise one or more device identifiers (IDs). The operations may include causing to send a response to the MU-MIMO setup frame to the wireless device.

The implementations may include one or more of the following features. The operations may include identifying an MU-MIMO transmission from the wireless device, when a device ID is indicated by the first RA field or the second RA field. The operations for causing to send a response to the MU-MIMO setup frame further may include the operations for causing to send a clear to send (CTS) frame to the wireless device. The MAC header comprises a transmit address (TA) field, wherein the TA field is located ahead of the first RA field. The first RA field is configured to contain one or more first device IDs of the one or more device IDs. The control trailer comprises a clear to send (CTS) response bitmap, the CTS response bitmap, including one or more bits, wherein the one or more bits are associated with at least one of the one or more device IDs. at least one of the one or more bits indicate if a first device is to send a response to the MU-MIMO setup frame, wherein the first device is associated with at least one of the one or more device IDs.

In example embodiments of the disclosure, there may be a method. The method may include generating a multiuser multiple-input and multiple-output (MU-MIMO) setup frame comprising a physical layer (PHY) header and a media access control (MAC) header. The method may include determining an indication of a control trailer after the MAC header, the MAC header comprising a first receive address (RA) field, and the control trailer comprising a second RA field, wherein the first RA or the second RA comprise one or more device identifiers (IDs). The method may include causing to send the MU-MIMO setup frame over a directional multi-gigabit (DMG) channel.

Implementations may include one or more of the following features. The MAC header comprises a transmit address (TA) field, wherein the TA field is located ahead of the first RA field. The first RA field is configured to contain one or more first device IDs of the one or more device IDs. The second RA field is configured to contain one or more second device IDs of the one or more device IDs. The control trailer comprises a clear to send (CTS) response bitmap, the CTS response bitmap, including one or more bits, wherein the one or more bits are associated with at least one of the one or more device IDs. at least one of the one or more bits indicate if a first device is to send a response to the MU-MIMO setup frame, wherein the first device is associated with at least one of the one or more device IDs. The control trailer comprises scheduling information to schedule at least one of a plurality of devices in a plurality of successive physical layer convergence protocol (PLCP) protocol data units (PPDUs) within a transmit opportunity (TxOP). The MU-MIMO setup frame has a structure compatible with a DMG request to send (RTS) frame structure.

The implementations may include one or more of the following features. According to example embodiments of the disclosure, there may be a device. The device may include at least one memory that stores computer-executable instructions, and at least one processor of the one or more processors configured to access the at least one memory, wherein the at least one processor of the one or more processors is configured to execute the computer-executable instructions to the first RA or the second RA comprise one or more device identifiers (IDs). The at least one processor of the one or more processors may be configured to execute the computer-executable instructions to means for causing to send the MU-MIMO setup frame over a directional multi-gigabit (DMG) channel.

Implementations may include one or more of the following features. The MAC header comprises a transmit address (TA) field, wherein the TA field is located ahead of the first RA field. The first RA field is configured to contain one or more first device IDs of the one or more device IDs. The second RA field is configured to contain one or more second device IDs of the one or more device IDs. The control trailer comprises a clear to send (CTS) response bitmap, the CTS response bitmap, including one or more bits, wherein the one or more bits are associated with at least one of the one or more device IDs. at least one of the one or more bits indicate if a first device is to send a response to the MU-MIMO setup frame, wherein the first device is associated with at least one of the one or more device IDs. The control trailer comprises scheduling information to schedule at least one of a plurality of devices in a plurality of successive physical layer convergence protocol (PLCP) protocol data units (PPDUs) within a transmit opportunity (TxOP). The MU-MIMO setup frame has a structure compatible with a DMG request to send (RTS) frame structure.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device for establishing multiuser (MU) multiple-input multiple-output (MIMO) channel access with two or more station devices, comprising:
   at least one memory that stores computer-executable instructions; and
   at least one processor configured to access the at least one memory, wherein the at least one processor is configured to execute the computer-executable instructions to:
      determine a request frame associated with the MIMO channel access, wherein the request frame is a request to send (RTS) frame;
      determine a control trailer field of the request frame comprising identification of the two or more station devices;
      determine to set one or more bits in one or more fields of the request frame indicating an inclusion of the control trailer field in the request frame, wherein the one or more bits are set in a legacy header field of the request frame;
      cause to send the request frame to the two or more station devices;
      identify a response frame from at least one of the two or more station devices; and
      cause to send a multiuser physical layer convergence protocol data unit (MU-PPDU) to the at least one of the two or more station devices;
      wherein the control trailer field follows a frame check sequence (FCS) field of the request frame.

2. The device of claim 1, wherein the control trailer field follows a payload field of the request frame.

3. The device of claim 1, wherein the request frame indicates an intent to transmit the MU-PPDU.

4. The device of claim 3, wherein the identification identifies at the least one of the two or more station devices as intended recipients of the MU-PPDU.

5. The device of claim 3, wherein the identification is a group identification (ID) associated with the at least one of the two or more station devices.

6. The device of claim 1, wherein the request frame comprises a legacy portion.

7. The device of claim 1, further comprising a transceiver configured to transmit and receive wireless signals.

8. The device of claim 7, further comprising one or more antennas coupled to the transceiver.

9. A non-transitory computer-readable medium storing computer-executable instructions which when executed by one or more processors of a station device result in performing operations comprising:
 identifying a request frame, received from an access point, comprising one or more fields associated with a multiple-input multiple-output (MIMO) channel access, wherein the request frame is a request to send (RTS) frame;
 identifying an indication that a control trailer field is included in the request frame, wherein the control trailer field comprises identification of the station device, wherein the indication includes a set value of one or more bits in a legacy header field in the request frame;
 causing to send a response frame to the access point; and
 identifying a multiuser physical layer convergence protocol data unit (MU-PPDU) received from the access point;
 wherein the control trailer field follows a frame check sequence (FCS) field of the request frame.

10. The non-transitory computer-readable medium of claim 9, wherein the control trailer field follows a payload field of the request frame.

11. The non-transitory computer-readable medium of claim 9, wherein the identification is a group identification (ID) associated with one or more station devices.

12. A method for establishing multiuser (MU) multiple-input multiple-output (MIMO) channel access with two or more station devices, comprising:
 determining, by one or more processors, a request frame associated with the MIMO channel access, wherein the request frame is a request to send (RTS) frame;
 determining a control trailer field of the request frame comprising identification of the two or more station devices;
 determining to set one or more bits in one or more fields of the request frame indicating an inclusion of the control trailer field in the request frame, wherein the one or more bits are set in a legacy header field of the request frame;
 causing to send the request frame to the two or more station devices;
 identifying a response frame from at least one of the two or more station devices; and
 causing to send a multiuser physical layer convergence protocol data unit (MU-PPDU) to the at least one of the two or more station devices;
 wherein the control trailer field follows a frame check sequence (FCS) field of the request frame.

13. The method of claim 12, wherein the control trailer field follows a payload field of the request frame.

14. The method of claim 12, wherein the request frame indicates an intent to transmit the MU-PPDU.

15. The method of claim 14, wherein the identification identifies at the least one of the two or more station devices as intended recipients of the MU-PPDU.

\* \* \* \* \*